UNITED STATES PATENT OFFICE.

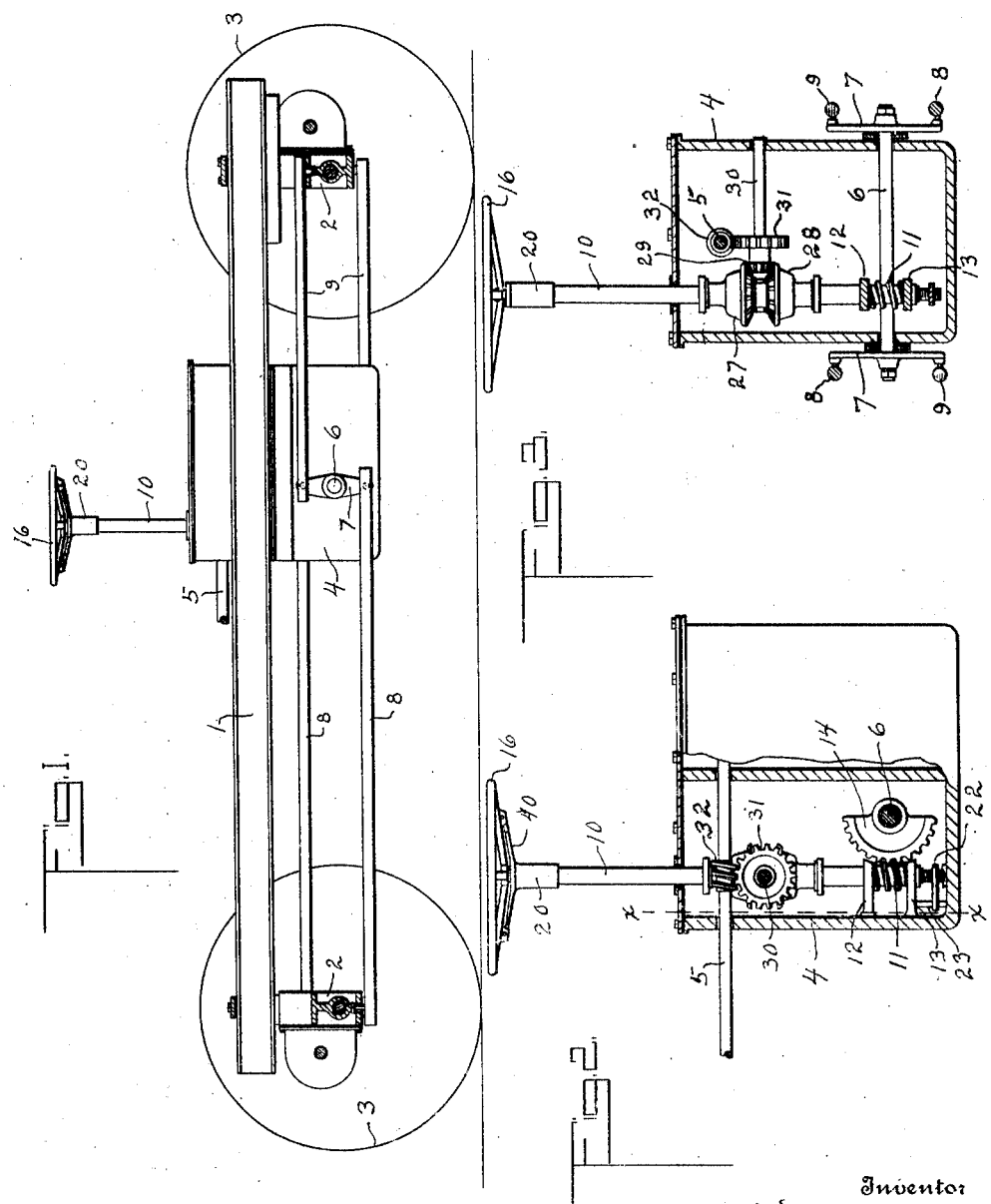

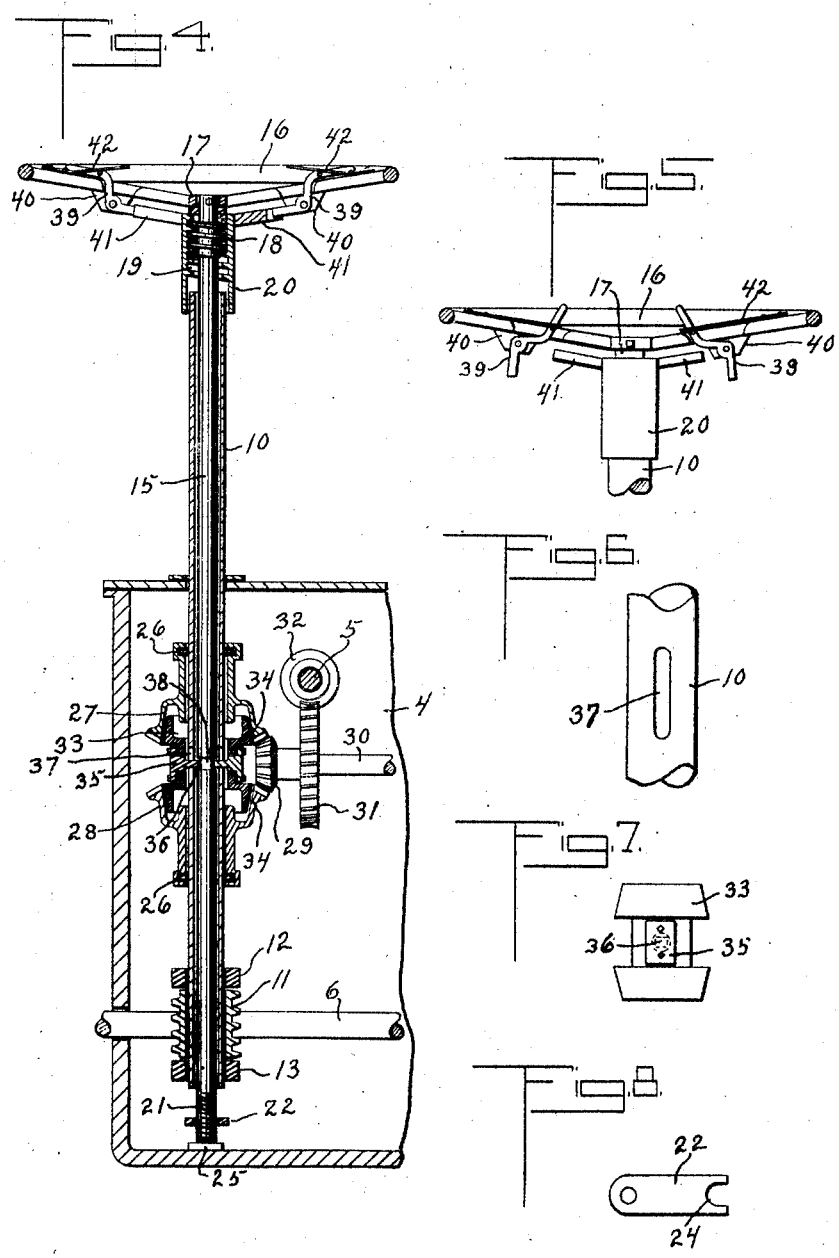

WALTER S. MORTON, OF MOLINE, ILLINOIS, ASSIGNOR TO TRACTOR PRODUCING CORPORATION, OF NEW YORK, N. Y.

STEERING DEVICE FOR MOTOR-VEHICLES.

1,334,959.  Specification of Letters Patent.  Patented Mar. 30, 1920.

Application filed February 20, 1918, Serial No. 218,221. Renewed January 29, 1920. Serial No. 354,881.

*To all whom it may concern:*

Be it known that I, WALTER S. MORTON, a citizen of the United States, residing at Moline, in the county of Rock Island and State of Illinois, have invented certain new and useful Improvements in Steering Devices for Motor-Vehicles, of which the following is a specification.

My invention has reference to steering devices for motor-vehicles, and is more specially designed for use in connection with the machine shown and described in my application for Letters Patent of the United States of even date herewith, for improvements in four-wheel drive devices, the mechanism for controlling the action of the axles and carrying wheels from a central rocking element being similarly shown in both applications. The invention is not limited to such use, however, but can be employed in any machine where it is desired to impart the movement of a main drive shift to another movable member for the purpose of steering the machine.

The chief purpose of my invention is to have the steering devices actuated by power, by connecting them up with the main drive shaft, as mentioned, and in such a manner that said devices will respond quickly to the movement of said shaft, when it is desired to turn the machine in either direction. This is specially desirable in heavy trucks, and tractors of the kind described in said companion application, to relieve the driver from the extra strain occasioned by such machines when in movement. The device is also adapted to be manually operated, if desired.

Further objects and advantages of the invention will appear in the following specification, reference being had to the accompanying drawings, in which:

Figure 1 is a side elevation of a frame and running gear, equipped with my device. Fig. 2 is a partial longitudinal section of the casing 4, disclosing the steering devices contained therein. Fig. 3 is a cross-section thereof, in the line $x$—$x$ of Fig. 2. Fig. 4 is a vertical section of the steering post and parts associated therewith. Fig. 5 is a detail of the steering wheel and appurtenant parts. Fig. 6 shows a fragmentary portion of the post 10. Fig. 7 is a detail view of the clutch member 33. Fig. 8 is a detached view of the traveler 22.

Similar parts are indicated by corresponding numbers of reference throughout the several figures.

1 indicates the frame of a motor vehicle, 2 the axles, and 3 the carrying wheels therefor. Within the frame is mounted a casing 4, in which is mounted longitudinally of the frame a main drive shaft 5, to which movement may be imparted from any suitable source of power, such as is usually employed in machines of that type. Transversely of the casing 4 is mounted therein a rock-shaft 6, to each end of which is fixed a cross-head 7, from which pairs of rods 8 and 9 project in opposite directions to pivotal connections with the front and rear axles. The rods which are connected with the upper ends of the cross-heads are attached to the upper plates of the axles, and the lower rods are connected with the lower plates thereof. When movement is imparted to the rock-shaft said rods operate to turn the axles and wheels connected therewith, in opposite directions.

The present invention has to do chiefly with means for causing the movement of the shaft 5 to be imparted to the shaft 6, to give to said axles the desired movements, said means comprising the following parts:—10 is a hollow post, partly within the casing and partly above the same, which post is provided near its lower end with a worm gear 11, between bearings 12 and 13, secured to the casing. Said gear and the post 10 are held thereby from vertical movement in either direction. Secured to the shaft 6 is a sector gear 14, in mesh with the gear 11, and adapted to be given a partial rotation thereby in either direction, resulting in the desired rocking of the shaft 6.

Centrally of the post 10 is a rod 15, to the upper end of which is fixed a steering-wheel 16, provided with a hub 17, having a thread 18, engaging a corresponding thread 19 on the inner face of a cylindrical head 20 fixed to the post 10. A rotation of the wheel 16 results in a movement of the rod 15 upwardly or downwardly, as desired. At its lower end the rod 15 has a threaded reduced portion 21, on which is a traveler 22, threaded so as to operate on the member 21, when the same is rotated, so as to move upwardly or downwardly. Said traveler is prevented from rotating with the rod by means of a recess 24 in one end thereof in engagement with a post 23 fixed in the bottom of the casing 4. When the wheel 16 is turned a certain distance in one direction said traveler comes in contact with the lower end of the post 10 and prevents further movement of the wheel in that direction. Movement of the wheel in the opposite direction is similarly limited by said traveler coming in contact with a bearing 25 at the lower end of the rod 15.

That part of the post 10 which is in the upper part of the casing 4 is provided with a pair of annular supports 26, upon which are rotatably mounted a pair of clutch-gear wheels 27 and 28, engaged by a pinion 29 on the end of a shaft 30, mounted in the casing 4 transversely of the shaft 5. Also secured to the shaft 30 is a worm-gear wheel 31, engaged by a worm-gear pinion 32 fixed on the shaft 5. Movement is thereby imparted to the wheels 27 and 28, whenever the shaft 5 is in motion, to cause a rotation thereof in opposite directions, but loosely with relation to the post 10. Loosely encircling the post 10, between the wheels 27 and 28, is a double cone clutch member 33, adapted to engage one or other of the inclined inner faces 34 of said wheels. On opposite sides of the clutch 32 are secured thereto small plates 35, provided with pins 36 which project inwardly through slots 37 in the post 10 and engage an annular groove 38 in the rod 15, the inner ends of the pins being concaved to conform to the shape of said rod. When the wheel 16 is turned in a direction to move the rod 15 upwardly the connection between such rod and the clutch 33 results in an upward movement of such clutch, until it is caused to engage the wheel 27, whereupon said clutch is caused to rotate, carrying with it the post 10, and rocking the shaft 6 in the desired direction. A movement of the wheel 16 in the opposite direction results in a similar downward movement of the member 33, into engagement with the wheel 28, and the post is turned in the opposite direction, with a corresponding contrary movement of the rock-shaft 6.

When the operator ceases to turn the wheel 16 in either direction the engagement of the threads on the hub thereof with those of the head 20 is relaxed, and the movement of the post 10 ceases, but if the carrying-wheels are turned in either direction from a straight line, they continue in such direction until returned by a movement of the steering-wheel in the opposite direction.

If desired, the post 10 can be operated directly from the steering wheel, by locking such wheel to the post, in the following manner: Two of the bars of the wheel are provided with levers 39, fulcrumed in ears 40 on said bars, the inner ends of said levers being adapted to engage recesses in arms 41 projected outwardly from the head 20. The wheel and post are thus connected so that they will rotate together, and there will be no movement of the rod 15 vertically of the post. This can of course only be accomplished when the clutch 33 is in a neutral position. Engagement of the levers with the arms 41 is enforced by means of springs 42 on the wheel, engaging pins in said levers. By the same means said levers are held in an inoperative position, as shown in Fig. 5.

What I claim as my invention, is—

1. A device of the class described, comprising, in combination with a main drive shaft and a rock-shaft to be actuated thereby; a rotatable hollow post; gearing for imparting the movement of said post to said rock-shaft; a rod vertically movable within said post; a steering-wheel fixed to the upper end of said rod, and operatively connected with said post, so as to produce a vertical movement in said rod when said wheel is rotated; and gearing connecting said drive-shaft with said hollow post, adapted to be thrown into operation by said rod upon a movement thereof upwardly or downwardly.

2. A device of the class described, comprising, in combination with a main drive-shaft and a rock-shaft to be operated thereby; a rotatable hollow post, provided at its upper end with a spiral rib; a rotatable member above said post, provided with a spiral rib capable of coöperating with said first-named rib to move said rotatable member upwardly or downwardly upon the rotation thereof; gearing connecting said post with said rock-shaft, to impart the movement of said post to said shaft; gearing connecting said post with said drive-shaft, to impart the movement of said shaft to said post, but normally out of operable engagement therewith; and a rod within said post, movable vertically with said rotatable member, and operatively connected with said last-named gearing so as to produce a movement of said post thereby, upon an upward or downward movement of said rod.

3. A device of the class described, comprising, in combination with a main drive shaft and counter-shaft to be actuated thereby, a hollow post rotatably mounted and operatively connected with said counter-shaft; clutch devices mounted on said post and operable independently thereof; gearing connecting said clutch devices with said drive shaft to impart the movement of said shaft to said devices; a rod movable in said post, and provided at its outer end with means for the rotation thereof; means for imparting movement to said rod, longitudinally of said post, upon said rod being rotated; and means for imparting said longitudinal movement of the rod to said clutch devices, to cause a rotation of the post thereby, in either direction, as desired.

4. In a device of the class described, a hollow rotatable member, provided at one of its ends with a spiral member; a rod centrally of said hollow member, provided with means for coöperating with said spiral member, to cause a movement of the rod longitudinally of said hollow member; means for suitably rotating said rod; clutch devices carried by said hollow member, so as to operate independently thereof; a clutch member rotatable with said hollow member, and adapted to engage said clutch devices, and means for imparting the longitudinal movement of said rod to said clutch member, to cause an engagement thereof with said clutch devices.

5. In a device of the class described, a hollow rotatable member, provided at its upper end with a spiral rib; a rod rotatable in said hollow member, and provided with a spiral rib in engagement with said first named rib; means for rotating said rod; a pair of clutch gears rotatably mounted on said hollow member; means for imparting movement to said clutch-gears in opposite directions; a clutch member rotatable with said hollow member and adapted for engagement with either of said clutch gears, independently of the other; and means for imparting the movement of said rod to said clutch member, to cause an engagement thereof with one of said clutch gears.

6. In a device of the class described, a hollow steering post, provided with an internally threaded head at its upper end; a rod centrally of said post, provided with exterior threads in engagement with said first-named threads, capable of raising or lowering said rod upon the rotation thereof; a hand-wheel fixed to said rod; clutch gears rotatably mounted on said post so as to operate in opposite directions; a clutch member rotatable with said post and adapted for alternate engagement with said clutch gears; means for operatively connecting said clutch member with said rod; and means for limiting the rotation of said rod in either direction.

7. In a device of the class described, a hollow steering post; a rod movable therein and provided midway its ends with an annular groove, said post and rod being operatively connected at their upper ends, so that the rotation of said rod results in a movement thereof longitudinally of said post; clutch devices rotatably mounted on said post, and operable in opposite directions thereon; a clutch member adapted for engagement with said clutch devices; and means carried by said clutch member, in engagement with said annular groove, and adapted to move said member upwardly or downwardly coincidently with the movement of said rod.

8. In a device of the class described, a hollow steering post, provided in its walls with longitudinal slots; a rod movable in said post and provided with an annular groove in line with said slots, said post and rod being operatively connected at their upper ends, so that the rotation of the rod will cause a vertical movement thereof; means for rotating said rod; clutch gears rotatably mounted on said post and operable in opposite directions; a clutch member adapted for engagement with either of said gears, independently of the other; and pins projecting from said clutch member inwardly through said slots and into said annular groove, to impart the vertical movement of said rod to said clutch member.

9. In a device of the class described, a hollow steering post, provided at its upper end with a threaded member; a rod centrally of said post, provided with a thread in engagement with said first-named thread member, to move said rod vertically upon the rotation thereof; a steering wheel secured to said rod; clutch devices rotatably carried by said post; a clutch member rotatable with said post, and adapted for engagement with said clutch devices; means for imparting the vertical movement of said rod to said clutch member, to cause an engagement thereof with said clutch devices; locking levers carried by said steering wheel; and arms projecting from the head of said steering post adapted to be engaged by said levers, to hold said wheel and post in locked relation.

10. In a device of the class described, the combination of a suitable frame, and running gear therefor; a rock-shaft mounted in said frame; means for imparting the movement of said rock-shaft to said running gear, to suitably operate the same; a hollow steering post, mounted in said frame and operatively connected with said rock-shaft; a rod centrally of said post, said post and rod having coöperating means for causing a vertical movement of said rod upon a rotation thereof; clutch devices on said post operatively connected with said rod; and means for suitably actuating said clutch-devices.

In testimony whereof I affix my signature.

WALTER S. MORTON.